April 14, 1970     W. S. BLANDING     3,506,431
MOLD FOR THE CENTRIFUGAL FORMING OF MOLTEN GLASS
Filed May 24, 1965     4 Sheets-Sheet 1

INVENTOR.
Wendell S. Blanding

BY Charles W. Gregg

AGENT

April 14, 1970 W. S. BLANDING 3,506,431
MOLD FOR THE CENTRIFUGAL FORMING OF MOLTEN GLASS
Filed May 24, 1965 4 Sheets-Sheet 2

INVENTOR.
Wendell S. Blanding
BY Charles W. Gregg
AGENT

INVENTOR.
Wendell S. Blanding
BY Charles W. Gregg
AGENT

United States Patent Office 3,506,431
Patented Apr. 14, 1970

3,506,431
MOLD FOR THE CENTRIFUGAL FORMING OF MOLTEN GLASS
Wendell S. Blanding, Painted Post, N.Y., assignor to Corning Glass Works, Corning, N.Y., a corporation of New York
Filed May 24, 1965, Ser. No. 458,127
Int. Cl. C03b *19/04*
U.S. Cl. 65—302
8 Claims

ABSTRACT OF THE DISCLOSURE

A centrifugal forming mold for forming glass funnel members for television picture tube envelopes, such mold including a mold cavity having an inverted generally rectangular frusto-pyramidical configuration and provided with an abruptly flared region adjacent, below and extending horizontally parallel with the peripheral trimming line of funnel members formed therein, such flared region diminishing in depth from the centers of the sidewalls of the mold toward the corners thereof.

---

The present invention relates to centrifugal forming. More specifically the present invention relates to the centrifugal forming of funnel members or parts to be used in the making of cathode-ray tube envelopes. Still more particularly this invention relates to a mold for and a method of forming, by centrifugal force, glass funnel parts or members to be employed in the fabrication of color or polychromatic television picture tube envelopes having a generally rectangular frusto-pyramidical configuration.

The centrifugal forming or spinning of glass funnel members or parts to be sealed to complementally-mating glass viewing panel parts or members to make so-called rectangular monochromatic cathode-ray or television picture tube envelopes is now relatively old and well known in the art. In such fabrication of monochromatic tube envelopes from the complementally-mating glass members, such members are directly fusion sealed to each other to make the television tube envelopes. However, in the relatively recent development of color or polychromatic television picture tubes, it was found that direct fusion sealing of the mating viewing panel and funnel members was impractical due to the possibility of the excess heat used in fusion sealing causing harm to certain elements employed in such polychromatic tubes. Furthermore, in the fabrication of rectangular color television picture tube envelopes, it was found impractical to fusion seal the rectangular viewing panel and funnel members to each other while maintaining the extremely critical alignment that is required between such members in the completed tube envelope. These problems are now well known to those skilled in the art.

In view of the above problems, thermal sealing compositions or solder glass frits having relatively low melting temperatures were and are employed for sealing round polychromatic viewing panel and funnel members to each other, a coating of such materials being applied to the mating annular sealing surfaces of such members for such purpose. Although extremely improved sealing compositions or thermal sealing glass frits have been developed, it was additionally found that, due for example, to the high voltage employed in the operation of color or polychromatic television picture tubes and the resultant increased possibility of a power leakage path through the sealing material used between the sealing surfaces or edges of the mated members, wider sealing surfaces or edges than those previously employed on the members used in the fabrication of monochromatic picture tubes had to be employed on the members used in the manufacture of polychromatic or color picture tubes.

The provision of wider sealing surfaces or edges on centrifugally formed funnel members for round polychromatic picture tubes is not difficult since such members, and therefore their forming mold or molds, are radially symmetric, at least in the region of the sealing surfaces or edges thereof. However, in the centrifugal forming of rectangular picture tubes, the glass supplied to the forming mold, in addition to moving vertically, tends to also move horizontally along the relatively straight or only slightly curved sidewalls of the mold and to collect or pile up in the corners of the mold during the spinning thereof. Such movement of the glass and the resultant thinner sidewalls are not detrimental factors in the centrifugal forming of funnel members for rectangular monochromatic picture tube envelopes because, as previously mentioned, the viewing panel and funnel members are directly fusion sealed to one another in the fabrication of such envelopes. Said movement of the glass and the resultant thinner sidewalls are however, detrimental factors in the forming of funnel members for rectangular polychromatic picture tube envelopes since such movement considerably reduces the width of the sealing surfaces or edges of the funnel members in certain regions thereof and makes it extremely difficult to maintain the aforementioned critical alignment required between the viewing panel and funnel members of a completed tube envelope. As is believed obvious, such reductions in the width of the sealing surfaces or edges of the funnel members are extensively prevalent intermediate the centers of the sidewalls of such members and the corner regions thereof, and occur especially intermediate the centers of the longer sidewalls of the funnel members and such corner regions. While wider sealing surfaces or edges could be formed on such funnel members by increasing the amount of glass supplied to the mold for the centrifugal forming of each member, such increased quantity of glass would obviously cause an even greater collection of glass in the corners of the mold, and an undesirable and excessive weight of the tube envelopes which are fabricated using such members.

It is accordingly, in view of the entire foregoing discussion, an object of the present invention to provide a mold adapted for the centrifugal forming of glass funnel members or parts to be used in the fabrication of rectangular polychromatic or color television picture tube envelopes.

It is another object of the invention to provide a novel method of making a rectangular funnel member or part to be used in the fabrication of polychromatic television picture tube envelopes having a generally rectangular frusto-pyramidical configuration.

A third object of the invention is the provision of a mold adapted for the centrifugal forming or spinning of rectangular funnel parts or members having a wider sealing surface or seal edge than heretofore provided in the regions adjacent the centers of the longer sidewalls of such members by a centrifugal forming process.

In accomplishing the above objects of the invention there is provided a centrifugal forming mold including a mold cavity having an inverted generally rectangular frusto-pyramidical configuration and provided with an abruptly flared or offset region adjacent, below and extending parallel with the peripheral trimming line of a glass cathode-ray picture tube funnel member formed therein, such flared region or offset preferably diminishing in depth from the regions of the centers of the sidewalls of mold toward the corner portions thereof.

Other objects and characteristic features of the invention will become apparent as the description proceeds.

It is believed expedient to point out at the outset of this description that the terms "minor axis" and "major axis" where used herein refer to imaginary lines extending between the centers of the longer sidewalls and shorter sidewalls, respectively, of the mold described, or of a funnel part formed therein; while the term "diagonal axes" refers to imaginary diagonal lines extending between the centers of the corner regions of such mold or of such funnel part. The term "longitudinal axis" refers to an imaginary line extending normal to and through the center of the plane of a horizontal cross-sectional area of the mold cavity of said mold.

The invention will best be understood with reference to the accompanying drawings wherein.

Figure 4:
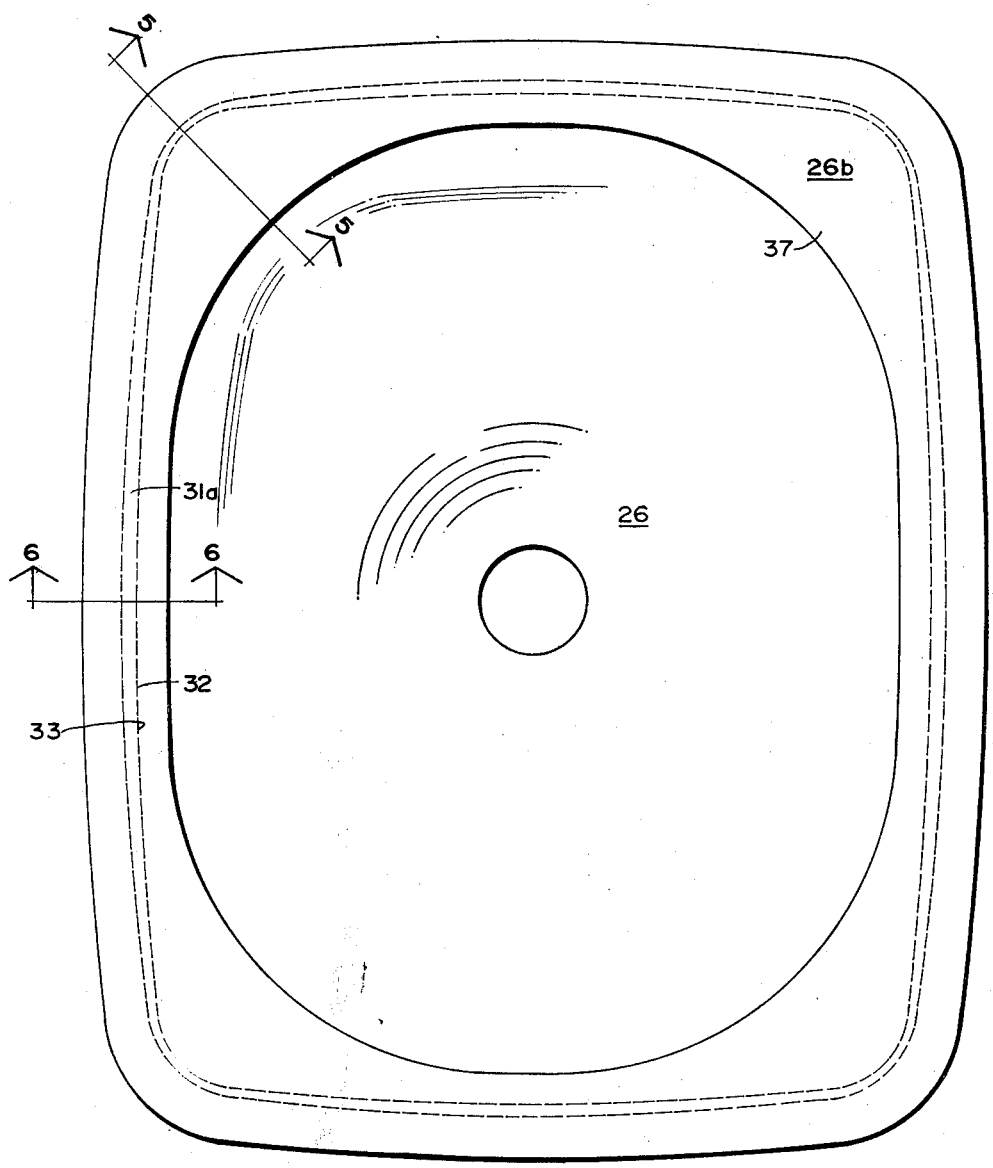
FIG. 4 is a top plan view of a modified form of mold also embodying the invention.
Figure 6:
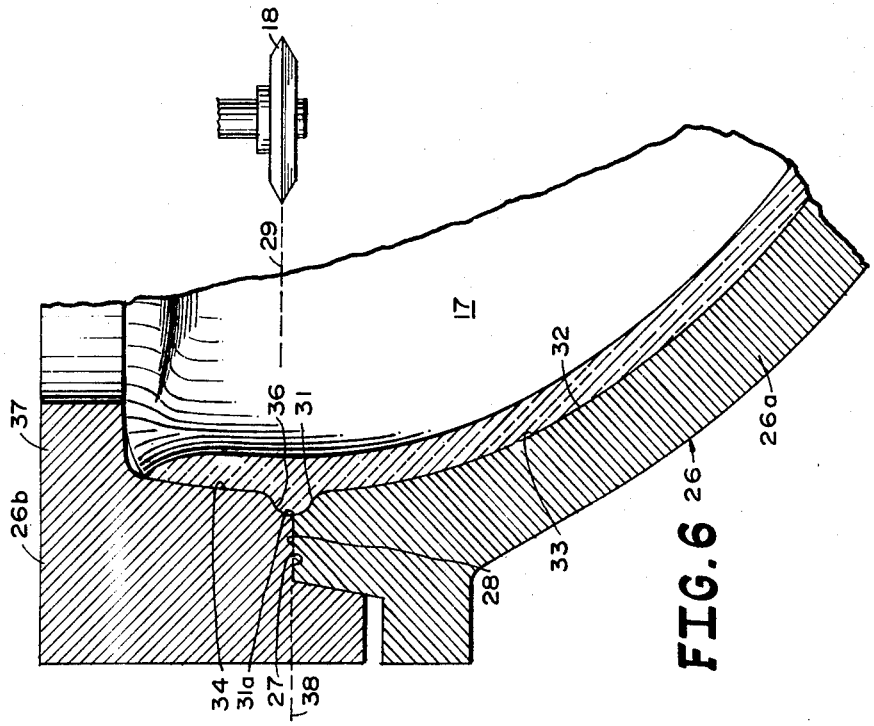
Figure 5:
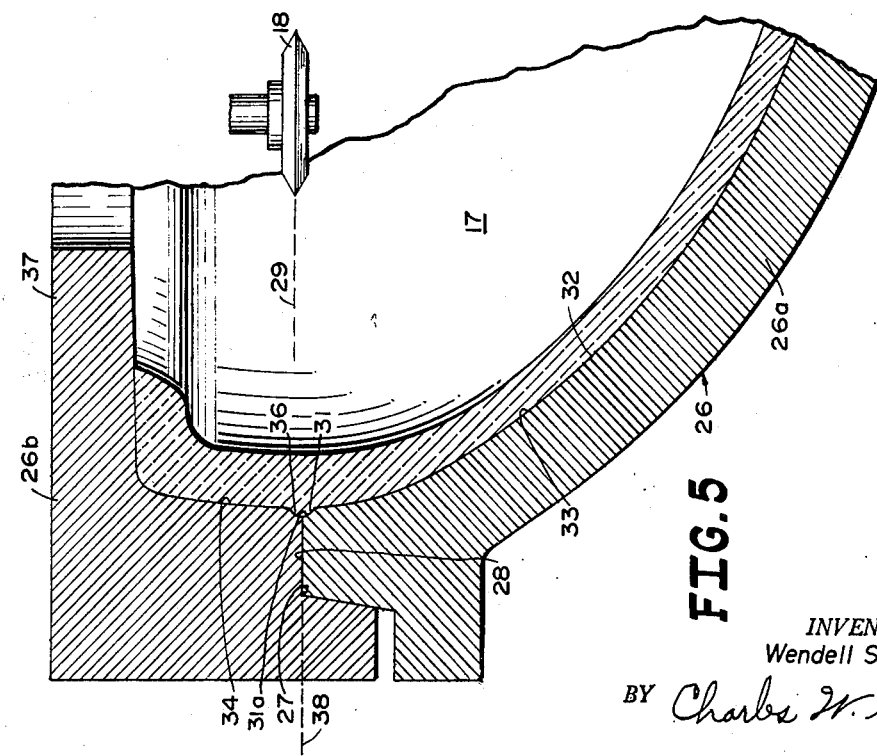

FIG. 5 is a cross-sectional view of a cross section of the mold of FIG. 4 taken generally along the line 5—5 of FIG. 4, and including a cross section of a fragment of a glass funnel part or member formed in such mold; and FIG. 6 is a cross-sectional view of a section of the mold of FIG. 4 taken generally along the line 6—6 of FIG. 4, and also including a cross section of a fragment of a glass funnel member or part formed in such mold.

Similar reference characters refer to similar parts in each of the associated figures of the drawings.

Figure 1:
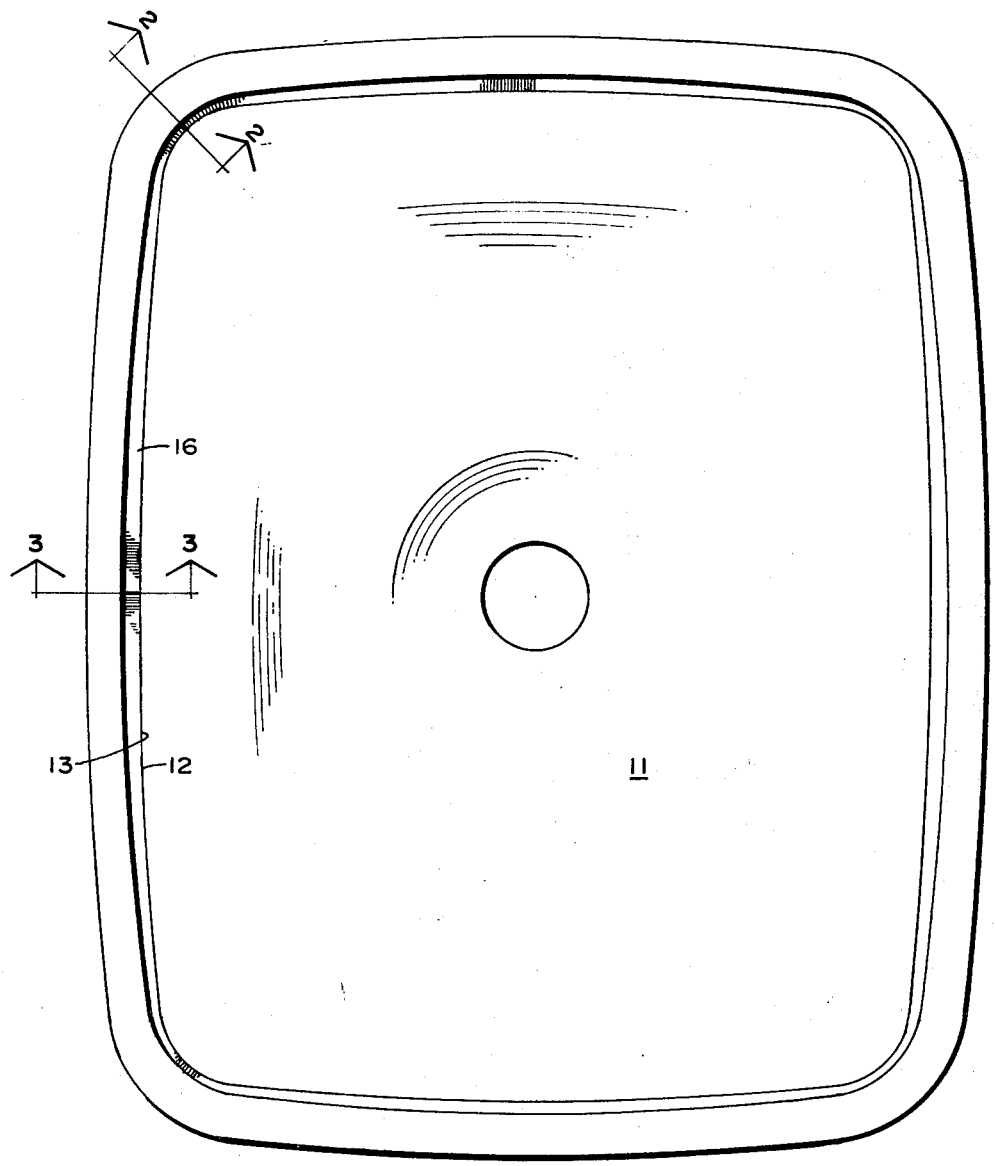
FIG. 1 is a top plan view of a mold for centrifugally forming a glass funnel part in accordance with the invention.
Figure 3:
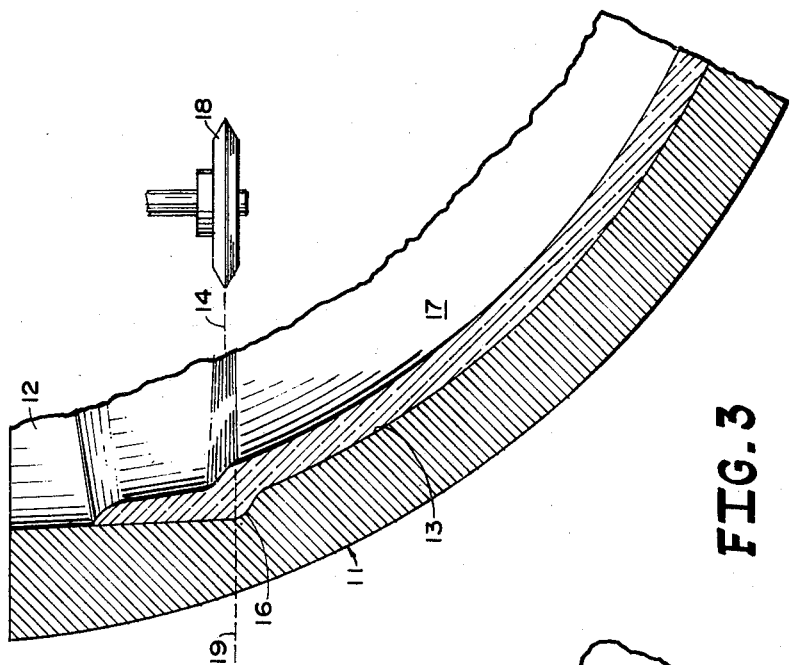
FIG. 3 is a cross-sectional view of a section of the mold of FIG. 1 taken generally along line 3—3 of FIG. 1, and also including a cross section of a fragment of a glass funnel member or part formed in the mold.
Figure 2:
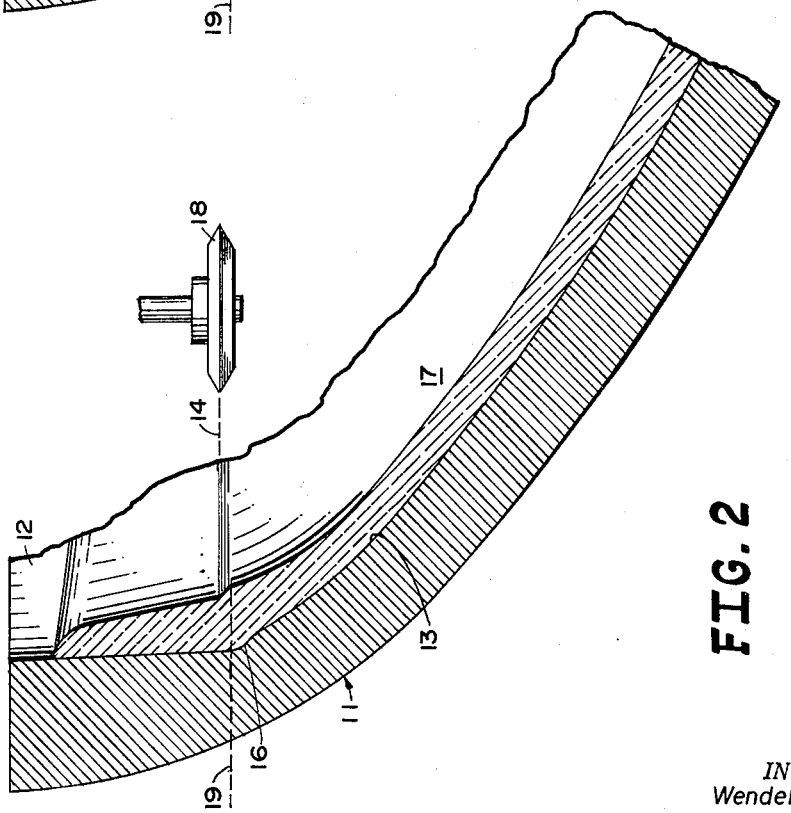
FIG. 2 is a cross-sectional view of a section of the mold of FIG. 1 taken generally along line 2—2 of FIG. 1, and including a cross-section of a fragment of a glass funnel part or member formed in the mold.

Referring to FIGS. 1 through 3 of the drawings there is illustrated a mold 11 for centrifugally forming funnel parts or members to be used in the fabrication of rectangular television picture tube envelopes, such funnel members or parts having a wide seal edge, especially useful, as previously mentioned, for the fabrication of envelopes for polychromatic television picture tubes. Such mold has an inner wall 12 contoured to define a mold cavity 13 having an inverted essentially or generally rectangular frusto-pyramidical configuration generally corresponding to the outside contours of funnel members or parts heretofore used for making rectangular monochromatic picture tube envelopes. However, as illustrated in FIGS. 1, 2 and 3, the inner wall 12 of mold 11, adjacent and below a moil trim or severance line indicated by the dotted line 14 (FIGS. 2 and 3) is sharply recessed to provide a shelf or an offset 16 therein which extends horizontally about the periphery of the inner wall 12 and preferably tapers in depth intermediate the ends of the major and minor axes of the mold or mold cavity and the ends of the diagonal axes thereof. That is to say, the inner wall 12 of mold 11, immediately below said moil trim or severance line 14, is abruptly flared outward to form an offset or sloping shelf 16 therein which extends horizontally about said wall and preferably diminishes in width or depth from the vicinity of or adjacent the ends of the major and minor axes of the mold or mold cavity towards the ends of the diagonal axes thereof. In other words, a horizontal plane of the cross-section of the mold cavity 13 immediately below the moil trim or severance line 14 for a funnel body 17 formed in the mold abruptly increases in area, such increase in area being provided by a diminution in the inner mold wall 12 in an area thereof which begins adjacent and below said trim line 14. The inner mold wall 12 extending upwardly from said moil trim or severance line 14, is substantially parallel with the longitudinal axes of mold cavity 13 or, moving in the upward direction from said trim line and along said inner wall, such wall slopes very slightly outward and away from the center of mold cavity 13 for ready removal of a funnel part formed therein. The moil trim or severance line 14 will be further discussed hereinafter in this description.

Referring further to FIGS. 2 and 3, it will be noted that the molten glass from which a funnel body 17 is centrifugally formed collects in a substantially greater thickness in the corner areas of the mold, that is, at the ends of the diagonal axes of the mold as illustrated in FIG. 2, than such glass does in the vicinity of the ends of the minor axis of the mold as illustrated in FIG. 3. Obviously, this is also true in relation to the vicinity of the ends of the major axis of the mold, a cross section of which at such location is not shown in the drawings for purposes of simplification thereof. In addition, it is pointed out that the molten glass also moves further up the sides of the inner mold wall in the vicinity of the corners of the mold than in the vicinity of the ends of the major and minor axes thereof.

In employing the mold of the present invention for forming a funnel body such as 17, a gob of molten glass is supplied to the mold cavity 13 of mold 11 and spun or centrifugally formed in the manner well known in the art, into such a funnel body. As the molten glass moves up the surface of the inner wall 12 of mold 11 during the spinning thereof, it flows into the shelf or offset 16 in such wall and thereby provides, in the wall of the funnel body, an area or region of somewhat greater thickness (FIG. 3) than the thickness of the wall below said shelf or offset 16 in the vicinity of the ends of said major and minor axes. Such area or region of greater wall thickness extends horizontally along the relative straight sections of the sidewalls of the funnel body just below the moil trim or severance line 14.

Following the centrifugal forming of a funnel body such as 17, the funnel body is made into a funnel member or part by engaging the inner surface of the formed funnel body with a grooving member 18, before the glass has become set, and applying pressure to such grooving member to form a groove in said funnel body along said moil severance or trim line 14 as rotation of mold 11 and the funnel body is continued. Thereafter, the funnel body is removed from mold 11 and heat is extracted at different rates from the portions of the funnel body on opposite sides of the formed groove, thereby establishing a temperature gradient between such portions to effect severance or separation of such portions along said formed groove or said moil trim line 14. Subsequent to such severance of the portions of the funnel body, the edge remaining on the lower body portion is ground down to the plane of the thickest or widest area of the wall of the funnel body. This plane is indicated by the dotted line 19 and, as previously pointed out, such area is provided in the funnel body by said offset or shelf 16 in the inner wall 12 of mold 11. Such grinding step completes the making of the funnel part or member.

Reference is made to Letters Patent of the United States 2,629,206 issued Feb. 23, 1953, to James W. Giffen et al. for Glass Severing, if a more complete understanding of the step of severing the aforesaid portions of the funnel body is desired. The grooving member 18 of the present application may, for example, correspond to the glass severing member or disc 21 of such patent.

Referring now to FIGS. 4 through 6 of the drawings, the alternative form of mold embodying the invention will be discussed.

There is shown in FIGS. 5 and 6, a mold 26 comprising a main body portion 26a and a mold ring portion 26b. As illustrated, the bottom of mold ring portion 26b of mold 26 fits over and closely surrounds the outer periphery of the top of the main body portion 26a of mold 26 so that lateral or rotational relative movement between such portions is prevented but so that such ring portion may be readily separated from the body portion by vertically raising or moving the ring portion in an upward direction. A lower annular surface 27 of ring portion 26b conforms to and rests on the top of the complemental annular surface 28 of the main mold body portion 26a and bears thereagainst in a close face-to-face relationship to provide an effectively tight seal therebetween.

The main mold body portion 26a of mold 26, similarly to mold 11, has an inner wall 32 contoured to define a mold caivty 33 having an inverted essentially or generally rectangular frusto-pyramidical configuration generally corresponding to the outside contours of funnel members or parts to be formed, the inner wall 32 of the main body portion 26a of mold 26 being abruptly recessed, adjacent and below the moil trim or severance line indicated by to offset line 29, to provide an offset or shelf 31 similar to offset 16 provided in the inner wall 12 of mold 11. Offset 31 also preferably tapers or diminishes in depth from the vicinity of or adjacent the ends of the major and minor axes of the mold towards the ends of the diagonal axes thereof.

Mold ring portion 26b of mold 26 has an inner wall 34 which is recessed adjacent said moil trim line to provide in such wall an offset 36 which is complemental to the offset 31 provided in the main body portion 26a of mold 26. Such offset 36 also preferably tapers or gradually diminishes in depth from the vicinity of or adjacent the ends of the major and minor axes of the mold towards the ends of the diagonal axes thereof. When mold ring portion 26b of mold 26 is in position on top of the main body portion 26a of the mold as shown in FIGS. 5 and 6, the offsets 31 and 36 are contiguous and provide a channel 31a which preferably tapers in cross-section area intermediate the ends of said major and minor axes and the ends of said diagonal axes of mold 26.

The inner mold wall 34 of mold ring portion 26b, extending upwardly from said moil trim or severance line 29, may be parallel with the longitudinal axis of mold cavity 33 or, alternatively and as shown in FIGS. 5 and 6, and moving in the upward direction from said trim line along said inner mold 34, such wall may slope slightly inward and toward the center of the mold cavity 33 of mold 26. Mold ring portion 26b is also provided with an overhang 37 which extends over part of the large end of the mold cavity 33 of mold 26, such overhang being substantially wider adjacent the corner areas of the mold, than adjacent the other areas thereof, to catch the molten glass which moves to and collects in said corner areas during the spinning of a funnel body, such as 17, in the mold.

In the forming of a funnel body such as 17, mold 26 operates identically to mold 11 illustrated in FIGS. 1 through 3 of the drawings, and grooving member 18 is used to form a groove in said funnel body along moil severance or trim line 29 as rotation of mold 26 and the funnel body is continued. Thereafter, the mold ring portion 26b of mold 26 is separated from portion 26a of the mold and the funnel body is then removed from the mold. The portions of the funnel body on opposite sides of the formed groove are thereafter separated from each other by effecting severance thereof along said severance line or said formed groove in the manner previously discussed. Following such severance of the portions of the funnel body, the edge remaining on the lower body portion is ground down to the line 38 indicating the plane of the widest area of the relatively straight sections of the sidewalls of the funnel body, thereby completing the making of the funnel member or part 17, as previously described.

What is claimed is:

1. A mold for centrifugally forming funnel parts for rectangular television picture tube envelopes, such mold having a mold cavity of an inverted generally rectangular frusto-pyramidical configuration; the inner mold wall defining such cavity being abruptly recessed, adjacent and below a selected moil severance line for funnel parts formed in the mold, to provide an offset in such wall which extends horizontally therearound and tapers in depth from the vicinity of the ends of the major and minor axes towards the ends of the diagonal axes of the mold and mold cavity.

2. A mold in accordance with claim 1 in which the mold comprises two vertically separable portions including a lower main mold portion and an upper mold ring portion, a lower annular surface of said ring portion cooperating with the upper annular surface of said main portion in a face-to-face relationship and such two portions fitted to each other against lateral and rotational relative movement therebetween, said ring portion provided with an offset in its inner mold wall in justaposition and complemental to the offset in the inner mold wall of said main portion so that such offsets provide a channel tapering in cross-sectional area from adjacent the ends of said major and minor axes towards the ends of said diagonal axes.

3. A mold for centrifugally forming funnel parts for rectangular television picture tube envelopes, such mold having a mold cavity of an inverted generally rectangular frusto-pyramidical configuration, the horizontal planar area of such cavity sharply increasing adjacent a line extending horizontally about the inner wall of the mold near the large end thereof, such increase in area being provided by an offset in the inner wall of the mold, such offset gradually diminishing in depth from the regions of the ends of the major and minor axes of the mold towards the ends of diagonal axes thereof.

4. A mold in accordance with claim 3 in which the mold comprises two vertically separable portions including a lower main mold portion and an upper mold ring portion, a lower annular surface of said ring portion cooperating with the upper annular surface of said main portion in a face-to-face relationship and such two positions fitted to each other against lateral and rotational relative movement therebetween, said ring portion provided with an offset in its inner wall in juxtaposition and complemental to the offset in said inner wall of said main portion so that such offsets provide a channel tapering in cross-sectional area from the regions of the ends of said major and minor axes towards the ends of said diagonal axes.

5. A mold for centrifugally forming funnel parts for rectangular television picture tube envelopes, such mold having a mold cavity of a generally rectangular frusto-pyramidical configuration, the inner wall of said mold adjacent a peripheral line defining a horizontal planar area of the mold cavity near the large end thereof abruptly receding to form an offset in such inner wall which tapers in depth from the regions of the ends of the major and minor axes towards the ends of the diagonal axes of the mold and mold cavity.

6. A mold in accordance with claim 5 in which the mold comprises two vertically separable portions including a lower main mold portion and an upper mold ring portion, a lower annular surface of said ring portion cooperating with the upper annular surface of said main portion in a face-to-face relationship and such two portions fitted to each other against lateral and rotational relative movement therebetween, said ring portion provided with an offset in its inner wall in juxtaposition and complemental to the offset in said inner wall of said main portion so that such offsets provide a channel tapering in cross-sectional area from the regions of the ends of said major and minor axes towards the ends of said diagonal axes.

7. A mold for centrifugally forming funnel parts for rectangular television picture tube envelopes, such mold having a mold cavity of an inverted generally rectangular frusto-pyramidical configuration, the inner mold wall which defines such cavity flaring abruptly in an area extending horizontally about said wall approaching the large end of the mold cavity and below a selected moil severance line for funnel parts formed in the mold, such flared area of the inner mold wall forming a shelf which slopes downwardly toward the center of the mold cavity and gradually diminishes in width towards the ends of the diagonal axes of the mold.

8. A mold in accordance with claim 7 in which the mold comprises two vertically separable parts including a lower main body part and an upper mold ring part, a lower annular surface of said ring part facing and bearings against the upper annular surface of said body part, and such two parts fitted to each other to prevent lateral and rotational movement relative to one another, said ring part having a flared area in its inner mold wall contiguous with and complemental to the flared area of the inner mold wall of said body part so that such areas provide a groove which gradually diminishes in cross-sectional area towards the ends of said diagonal axes.

References Cited

UNITED STATES PATENTS

| | | | |
|---|---|---|---|
| 3,150,951 | 9/1964 | Mayhew | 65—302 |
| 1,947,526 | 2/1934 | Ingler | 65—70 |
| 2,629,206 | 2/1953 | Giffen et al. | 65—70 |
| 3,132,018 | 5/1964 | Prendergast et al. | 65—71 |
| 3,164,654 | 1/1965 | Spencer | 65—71 |

S. LEON BASHORE, Primary Examiner

E. R. FREEDMAN, Assistant Examiner

U.S. Cl. X.R.

18—20; 65—70, 71, 266